3,278,569
METHOD FOR PREPARING ESTERS FROM AROMATIC CHLOROMETHYL COMPOUNDS
Albert W. Simon, White Oak Borough, and Myron H. Wilt, Monroeville Borough, Pa., assignors to United States Steel Corporation, a corporation of Delaware
No Drawing. Filed Oct. 25, 1963, Ser. No. 318,804
3 Claims. (Cl. 260—410.5)

This invention relates to a method for preparing esters from aromatic chloromethyl compounds by a direct reaction with a carboxylic acid.

The conventional method for preparing an ester from an aromatic chloromethyl compound is to react an anhydrous metal salt of the carboxylic acid with the chloromethyl compound in an organic solvent, usually in the presence of a promoter such as pyridine or dimethylformamide. The anhydrous metal salts of carboxylic acids are not, in general, commercially available, and if they are, they are considerably more expensive than the free acids. The use of materials such as pyridine or dimethylformamide involves additional handling and recovery problems.

We have found that certain aromatic chloromethyl compounds may be esterified by a direct reaction with the free carboxylic acid. Suitable aromatic chloromethyl compounds for the practice of our invention comprise those derived from aromatic nuclei containing from 1 to 4 aromatic rings. The compounds include those derived from benzene, naphthalene, anthracene, phenanthrene, pyrene, fluoranthene, crysene, diphenylene oxide, fluorene, acenaphthene, carbazole, biphenyl, and terphenyl. Both mono- and dichloromethyl compounds fall within the scope of our invention.

We have also found that the reaction of the aromatic chloromethyl compounds, particularly those of the benzene series, is promoted by the presence in the aromatic nucleus of an electron-releasing substituent group, such as methyl or methoxy.

As an illustration, the direct esterification reaction of 1-chloromethylnaphthalene with a carboxylic acid takes place according to the following equation:

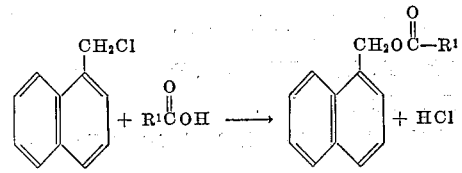

where $R^1$ is an alkyl radical derived from a carboxylic acid containing from 2 to 12 carbon atoms.

Since the reaction takes place between about 100° and 180° C., the resulting hydrogen chloride is driven off. However, the rate of the reaction is increased by continuously passing a stream of an inert gas, e.g., oxygen, air or nitrogen, through the reaction mixture to remove the hydrogen chloride as soon as it is formed. The hydrogen chloride may be used for the preparation of the chloromethyl compound. Thus, there is no loss of chlorine value in the over-all process; whereas, in the conventional method, the chlorine is lost as sodium chloride or other metal chloride, depending on which salt of the carboxylic acid is used.

The reaction will take place using molar equivalents of the carboxylic acid and the chloromethyl compound. However, if an excess of the acid is used, the excess acid serves as solvent and the reaction rate is increased. It is preferred to use a ratio of about 15 moles of carboxylic acid per mole of chloromethyl compound. At a ratio beyond about 20:1 the reaction is not assisted appreciably and the use of the additional acid becomes uneconomic. At ratios below about 5:1 the reaction time must be extended to maintain yield of ester.

The reaction has been carried out with $C_2$–$C_{12}$ aliphatic carboxylic acids. Although butyric acid was found to be more reactive at 115° C. with 1-chloromethylnaphthalene than either acetic or propionic acid, in general, it was found that the reactivity decreases with increasing chain length. However, the higher molecular weight acids will undergo reaction by increasing the reaction temperature. Temperatures appreciably in excess of about 180° C. are to be avoided, since the chloromethyl compound may undergo thermal polymerization.

A complete understanding of the invention may be obtained from the following typical examples of process showing how the compounds are made and used.

EXAMPLES 1–5

To 10 grams (0.057 mole) of 1-chloromethylnaphthalene was added 0.88 mole of acetic acid in a glass reaction apparatus equipped with a stirrer and a reflux condenser. The reaction mixture was heated to 115° C., and a stream of nitrogen (4 liters per hour) was passed through the stirred mixture to sweep out the hydrogen chloride as it was formed. The evolved hydrogen chloride was absorbed in a water scrubber, and samples from the scrubber were analyzed for chloride ion at intervals to determine the rate of ester formation. Infrared analyses of the material remaining after the excess carboxylic acid had been removed by distillation indicated that it consisted only of unreacted 1-chloromethylnaphthalene and the 1-naphthylmethyl acetate. Example 1 was repeated, except that the acid was changed. The results have been tabulated as follows:

Table I

| Example | Acid | Percent Ester Formed | |
| --- | --- | --- | --- |
| | | In 5 hours | In 10 hours |
| 1 | Acetic | 54 | 73 |
| 2 | Butyric | 57 | 73 |
| 3 | Propionic | 39 | 51 |
| 4 | Caproic | 14 | 27 |
| 5 | Caprylic | <1 | <2 |

EXAMPLE 6

A mixture containing 10 grams of 1-chloromethylnaphthalene and 52.5 grams of acetic acid was reacted at 115° C. in accordance with Example 1, except that oxygen was used as the purge gas instead of nitrogen. No oxidation products could be detected in the final reaction mixture. Only unreacted 1-chloromethylnaphthalene and 1-naphthylmethyl acetate were found to be present by infrared analysis, indicating that oxygen is satisfactory as the purge gas.

EXAMPLES 7–12

A number of aromatic chloromethyl compounds were reacted with either acetic acid or propionic acid at 115° C. in accordance with Example 1. The results are tabulated in Table II.

Table II

| Example | Compound | Acid | Percent Ester Formed in 10 hours |
| --- | --- | --- | --- |
| 7 | Benzyl chloride | Acetic | 4. |
| 8 | Bis(chloromethyl)durene | do | 78 Mono-ester, 22 Di-ester. |
| 9 | do | Propionic | 84 Mono-ester, 0 Di-ester. |
| 10 | p-Chloromethyltoluene | do | 5.5. |
| 11 | x-Chloromethyltetralins [1] | do | 56. |
| 12 | p-Methoxybenzyl chloride | do | 49 in 5.5 hours |

[1] A mixture of isomers of 5- and 6-chloromethyltetralin.

EXAMPLE 13

To 80 cc. of glacial acetic acid was added 5 grams of 9,10 - bis(chloromethyl) - s - octahydroanthracene. The mixture was refluxed at 115° C. while a stream of nitrogen was passed through the mixture. After cooling, the reaction mixture was poured into a liter of water to precipitate a solid, which after filtration and drying weighed 5.8 grams. Recrystallization of this solid from ethyl alcohol gave 3.3 grams of a product melting at 140° to 150° C. The infrared spectrum indicated that it contained a considerable amount of the 9,10-bis(acetoxy)-s-octahydroanthracene (literature M.P. 172° to 173° C.).

EXAMPLE 14

To 100 grams of 1-chloromethylnaphthalene was added 1500 grams of a commercial grade of pelargonic acid. The mixture was heated to 180° C. and stirred for 24 hours while a stream of nitrogen gas was passed through the reaction mixture at 8 liters per hour. The reaction mixture was vacuum distilled to remove the excess pelargonic acid and unreacted 1-chloromethylnaphthalene. A 1-naphthylmethyl pelargonate fraction boiling at 170°–185° C. at 0.4 mm. of mercury absolute was collected and weighed 110 grams. This weight represented a 65.2 percent yield of ester. Calculated on the basis of hydrogen chloride evolved, the yield was 62 percent.

While the above examples illustrate a preferred method of operation in esterifying certain chloromethylated aromatic compounds with a defined group of carboxylic acids, other conditions of operation may be used without departing from the spirit of the invention. A review of the above examples indicates there is some variation in the yield of esters that is obtainable by our method. For example, the yield of esterification product when reacting benzyl chloride and acetic acid is relatively low. Ordinarily, one would not be tempted to continue further experimentation in view of this yield, especially with relatively good yields obtainable when esterifying with metal salts of carboxylic acids. However, we have found, as indicated from the examples, that relatively good yields are obtainable under certain conditions. A slightly better yield is obtainable with p-chloromethyltoluene. With further methyl substitutions on the benzene ring as with bis-(chloromethyl)durene a good conversion is obtained. The same holds true where a methoxy group is substituted on the ring as with p-methoxybenzyl chloride. Further, relatively good yields are obtained, with or without methyl or methoxy substitution, when one or more aromatic rings are fused to the benzene ring as indicated by the example using a naphthalene compound. We have found that electron-donating groups substituted on the aromatic nucleus facilitate the reaction of a chloromethyl-substituted aromatic compound and a carboxylic acid.

As indicated by the specific examples, longer reaction times and reactions at higher temperatures will increase the ester yield with any preferred acid and permit use of our longer-chain alkyl acids. With increasing chain length, the boiling points of these acids increase. Use of a twelve-carbon carboxylic acid represents a practical rather than an absolute limit, since appreciably longer-chain acids distill in the range of the product esters and thus make economic and practical recovery of the ester difficult. Our esters have been found valuable as plasticizers for resins.

Although we have disclosed herein the preferred practice of our invention, we intend to cover as well any change or modification therein which may be made without departing from the spirit and scope of the invention.

We claim:
1. A method, carried out in the absence of a catalyst, for preparing an ester of the general formula

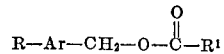

wherein Ar is an aromatic nucleus selected from the group consisting of benzene, naphthalene, anthracene, phenanthrene, pyrene, fluoranthene, chrysene, diphenylene oxide, fluorene, acenaphthlene, carbazole, biphenyl, and terphenyl, R is selected from the group consisting of hydrogen, alkyl and alkoxy groups, and $R^1$ is selected from the group consisting of alkyl radicals containing from 2 to 12 carbon atoms, comprising heating at a reaction temperature between about 100° and 180° C. a chloromethyl compound of the formula R—Ar—CH$_2$—Cl with an alkanoic acid of the formula

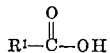

purging hydrogen chloride as soon as it is formed, with an inert purge gas, and recovering ester therefrom.

2. A method as defined in claim 1 wherein Ar is a benzene nucleus having a substituent group selected from the group consisting of methyl and methoxy.

3. A method as defined in claim 1 characterized by using a molar ratio of alkanoic acid to aromatic chloromethyl compound between about 1 to 1 and 20 to 1.

References Cited by the Examiner

FOREIGN PATENTS 169,040   7/1934   Switzerland.

LORRAINE A. WEINBERGER, *Primary Examiner.*

LEON ZITVER, *Examiner.*

D. P. CLARKE, V. GARNER, *Assistant Examiners.*